ically cancelled out by selective orientation of the YIG sphere.

United States Patent
Buck et al.

[15] 3,648,199
[45] Mar. 7, 1972

[54] TEMPERATURE-INDEPENDENT YIG FILTER

[72] Inventors: Daniel C. Buck, Hanover; James M. Schellenberg, Glen Burnie, both of Md.

[73] Assignee: Westinghouse Electric Corporation, Pittsburgh, Pa.

[22] Filed: June 1, 1970

[21] Appl. No.: 42,048

[52] U.S. Cl. .............................. 333/73, 333/24.1, 333/24.2
[51] Int. Cl. ........................................ H03h 7/10, H03h 5/00
[58] Field of Search ............................ 333/24.1, 1.1, 73 W

[56] References Cited

UNITED STATES PATENTS

| | | | |
|---|---|---|---|
| 3,246,263 | 4/1966 | Clark | 333/24.1 |
| 3,368,169 | 2/1968 | Carter | 333/73 W |
| 3,013,229 | 12/1961 | DeGrasse | 333/73 W |
| 3,409,823 | 11/1968 | Czerlinsky | 324/.5 |
| 3,452,298 | 1/1969 | Andrikian | 333/24.1 |

Primary Examiner—Herman Karl Saalbach
Assistant Examiner—C. Baraff
Attorney—F. H. Henson and E. P. Klipfel

[57] ABSTRACT

A cancellation effect is obtained between the temperature-dependent phenomenon of the externally applied magnetic field and the crystallographic orientation of a gyromagnetic element by utilizing a temperature compensating magnetic shunt in combination with a permanent magnet used to establish a unidirectional or DC magnetic field through the gyromagnetic element comprising a YIG sphere and selectively orienting its axis to a predetermined angle defined by the direction of the DC magnetic field wherein the resonance frequency of the YIG sphere increases with temperature. Thus, any decrease in saturation magnetization as a function of temperature is exactly cancelled out by selective orientation of the YIG sphere.

10 Claims, 5 Drawing Figures

Patented March 7, 1972 3,648,199

TEMPERATURE-INDEPENDENT YIG FILTER

CROSS REFERENCE TO RELATED APPLICATION

The present application is in part incorporated in the teachings of U.S. application Ser. No. 889,514 filed Dec. 31, 1969 in the name of Robert A. Moore et al. and entitled "YIG Resonator Microstrip Coupling Device". Said related application is also assigned to the assignee of the present invention.

BACKGROUND OF THE INVENTION

1. Field of the Invention

This invention relates to temperature stabilization of electromagnetic wave devices using magnetically polarizable gyromagnetic materials and more particularly relates to the cancellation of the variation with temperature of permanent magnets with an opposite temperature variation of the resonant frequency of the gyromagnetic material.

2. Description of the Prior Art

Temperature stabilization of gyromagnetic elements such as spheres of yttrium iron garnet (YIG), or similar cubic crystal material is well known to those skilled in the art. For example, U.S. Pat. No. 3,246,263 issued to J. G. Clark teaches that the saturization magnetization, the demagnetization field and the anisotropy field are all temperature-dependent so that the internal magnetization field of the sample varies as the temperature of the material changes due to changes in ambient temperature or because of the rise in temperature resulting in the absorption of electromagnetic wave energy within the material. This patent also teaches that the gyromagnetic elements are usually configured in small spheres because the effects of the saturization magnetization and the demagnetization field are substantially reduced or eliminated due to the spherical shape. Also, the anisotropy field associated with a crystalline structure of the material is substantially eliminated by aligning the crystalline structure with respect to the biasing magnetic field so that the biasing field is applied parallel to the (110) plane of the crystal and is inclined at an angle of approximately 30° to the [100] axis of the crystal.

Another method of eliminating the effect of anisotropy and concomitant temperature influence on the resonance field is disclosed in U.S. Pat. No. 3,409,823 issued to E. R. Czerlinsky, et al. Said patent teaches the orientation of a sample of material such that the external biasing field lies along any one of a continuous multiplicity of singular directions forming a conelike surface about each [100] direction and adjusting both the operating frequency of the device and the strength of the biasing field to satisfy the mathematical relationship $f = (\gamma/2\pi) H$, where $\gamma$ is the gyromagnetic ratio.

Additionally, U.S. Pat. No. 3,426,297 issued to M. Cohen discloses that tuning of a YIG sphere may be accomplished by coupling a rotatable dielectric rod thereto within the coupling iris.

Also, one form of temperature compensation of a gyromagnetic device is disclosed in U.S. Pat. No. 3,030,593 issued to W. H. Von Aulock, which discloses that temperature compensation of the externally applied magnetic field can be obtained by the utilization of a temperature dependent magnetic shunt in the field of the external magnet.

While the above-cited prior art operates in the manner intended, the present invention has for its object first the reduction of the temperature dependence of the externally applied magnetic field to a low level and then offsetting the remainder of this temperature dependence by selective orientation of a YIG sphere wherein resonance frequency varies in an opposite direction with temperature to a position where temperature dependence is completely nullified.

SUMMARY

Briefly, the subject invention is directed to an electromagnetic wave device employing magnetized gyromagnetic material comprising: electromagnetic wave-supporting means; means for coupling electromagnetic waves into and out of the wave-supporting means; a specimen of a single cubic crystal of gyromagnetic material that exhibits gyromagnetic effects to said electromagnetic waves and wherein said specimen is subject to temperature variations and wherein said specimen is positioned within the wave-supporting means in a path of a unidirectional magnetic field and being magnetically polarized in a given direction; a permanent DC magnet having a field variation in a first direction with increasing temperature in combination with a magnetic shunt coupled thereto, said shunt having a temperature variation in a second direction with increasing temperature, said permanent magnet and said shunt providing a partially temperature compensated DC magnetic field through said specimen of gyromagnetic material; and said specimen being crystallographically oriented so that its [111] axis is at a predetermined angle relative to said given direction of said partially temperature compensated DC magnetic field wherein the resonance frequency of said specimen varies in said second direction with temperature providing a second temperature compensation which exactly cancels out the remaining first direction temperature variation of the permanent magnet.

DESCRIPTION OF THE PREFERRED EMBODIMENTS

Magnetically polarizable gyromagnetic materials such as yttrium iron garnet are used quite extensively in electromagnetic wave devices and circuits because of their ability to introduce into the circuits reciprocal or nonreciprocal coupling, attenuation, phase shift, power limiting, frequency conversion, etc. The effective internal magnetizing field $H_{eff}$ within a magnetically polarizable gyromagnetic material ordinarily is a function of the saturation magnetization $B_s$ of the material, the applied biasing magnetic field $H_o$, the anisotropy field $H_{aniu}$ associated with the particular material, and the demagnetization field $H_d$ all of which are additionally a function of the shape of the specimen of the material used. The saturation magnetization $B_s$, the anisotropy field $H_{aniu}$ and the demagnetization fields $H_d$ are all temperature dependent so that the internal magnetization field $H_{eff}$ varies as the temperature of the material changes due to changes in ambient temperature and/or because of the rising temperature resulting from the absorption of electromagnetic wave energy within the material. The present invention utilizes small, highly polished, single-crystal spheres of gyromagnetic materials such as yttrium iron garnet, hereinafter referred to as YIG spheres, which act as electromagnetic energy couplers. When desirable other similar materials e.g., gallium substituted yttrium iron garnet and lithium ferrite may be utilized. The small spheres are used partially because of the effects of the saturation magnetization term $B_s$ and the demagnetization fields $H_d$ are substantially reduced because of the spherical shape. However, the anisotropy field associated with the crystalline structure of the material is dependent upon temperature and it has been observed that there is an intermediate crystallographic orientation around the [111] axis of Miller indices at which the resonance frequency increases with temperature. Throughout this application, the convention ( ) and [ ] signify crystallographically planes and axes, respectively, of Miller indices.

Figure 1:
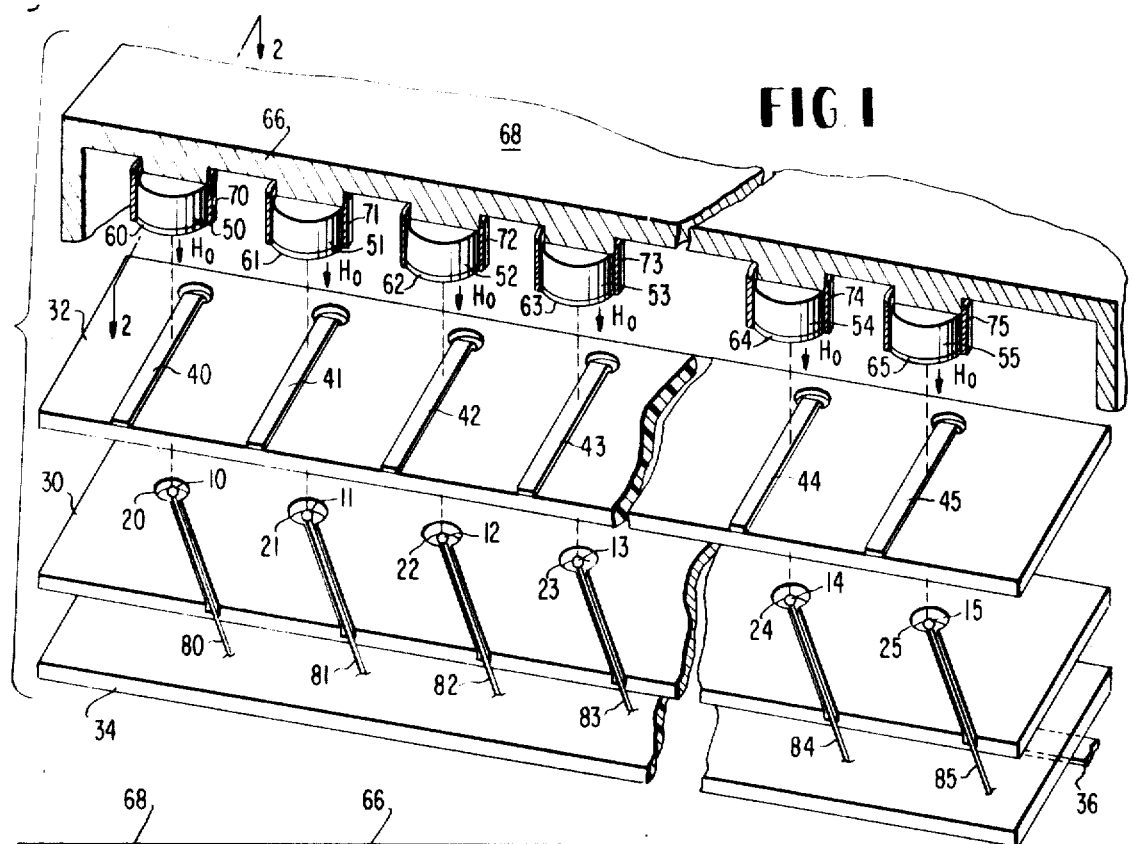
FIG. 1 is an exploded perspective view of an illustrative embodiment of the subject invention.

Referring now to the drawings, FIG. 1 discloses a YIG filter bank comprised of a plurality of static filter sections each of which is supplied its separate unidirectional or DC field by means of a temperature compensated permanent magnet. More particularly, the configuration shown in FIG. 1 discloses a plurality of YIG spheres 10, 11, 12, 13, 14 and 15, positioned within respective circular openings or irises 20, 21, 22, 23, 24 and 25 located in spaced-apart relationship in a metal ground plane 30 sandwiched between an upper and lower dielectric member 32 and 34. On the outer lower surface of the dielectric member 34 is a stripline metallic conductor 36 of electromagnetic energy which runs the entire length of the dielectric member 34 and is positioned thereon so that it runs beneath all of the YIG spheres 10 ... 15. The stripline conductor 36 comprises a common input means of electromagnetic energy for the YIG spheres thereby. Located on the top surface of the upper dielectric member 32 is a plurality of similar stripline metallic conductors 40 for electromagnetic wave energy 40, 41 ... 45. The stripline conductors 40, 41 ... 45 respectively couple to the YIG spheres 10, 11 ... 15 by being running directly above its respective YIG sphere and terminating in a short circuit in the ground plane 30 a predetermined distance away, e.g., less than ¼ wavelength. This is shown in greater detail in FIG. 2, which consists of a fragmentary cross section of the configuration shown in FIG. 1 for one filter section taken along the line 2—2. The stripline conductor 40 comprises an output means of electromagnetic energy and runs transverse to the input conductor 36. The plurality of stripline conductors 40, 41, 42 ... 45 are parallelly disposed on the dielectric member 32 for obtaining a plurality of frequency selective outputs of electromagnetic energy from an input signal including a wide band of diverse frequencies.

Figure 4:
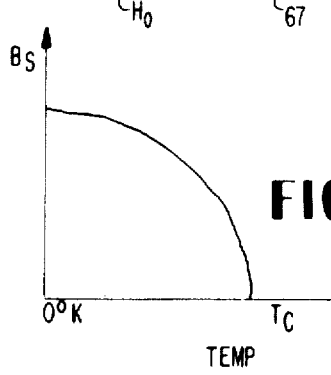
FIG. 4 is an illustrative curve of a typical variation of the saturation magnetization of a permanent magnet with respect to temperature.

Each of the YIG spheres 10, 11, etc. operate to gyromagnetically couple electromagnetic energy applied for example along the stripline conductor 36 to its respective output stripline conductor 40, 41, etc. due to gyromagnetic resonance, the frequency or linewidth of which is selectively controlled by the application of a magnetic biasing field $H_o$ applied therethrough. The respective magnetic biasing field $H_o$ for each YIG sphere 10, 11 ... 15 is provided by a separate respective permanent magnets 50, 51, 52, 53, 54, and 55 and their respective pole pieces 61, 62 ... 65. The DC or unidirectional field $H_v$ supplied by the respective permanent magnets 50, 51 ... 55 alone suffer the disadvantage of being temperature sensitive. The saturation magnetization $B_s$ of any permanent magnet decreases with increasing temperature and disappearing completely at the Curie temperature $T_c$ as shown in FIG. 4. The saturation magnetization curve can be expressed mathematically by the following approximation:

$$B_s(T) \cong B_{s_o}\sqrt[3]{1 - T^3/T_c^3} \qquad (1)$$

where $T$ is the operating temperature expressed in degrees Kelvin, $B_{so}$ is the saturation magnetization at 0° Kelvin, and $T_c$ is the Curie temperature expressed in degrees Kelvin.

Figure 2:
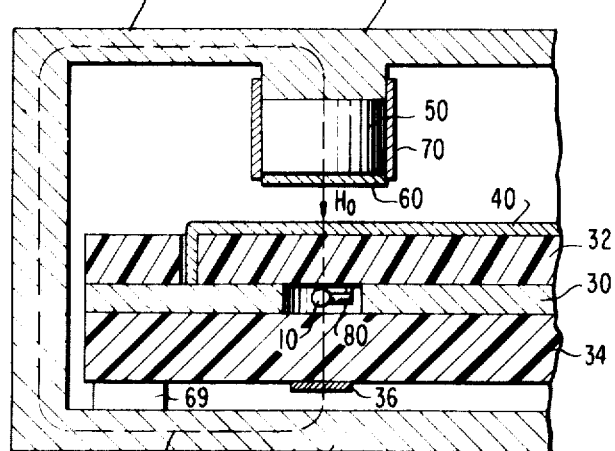
FIG. 2 is a cross-sectional view of the embodiment of the subject invention shown in FIG. 1 taken along the line 2—2.

Referring now to FIG. 2 wherein one typical filter section is disclosed in a fragmentary cross section of the embodiment shown in FIG. 1, the DC permanent magnet 50 and its respective pole piece 60 is mounted directly above the output stripline conductor 40 in direct vertical alignment with the YIG sphere 10 and the input stripline conductor 36. The magnet 50 is secured to a portion of the inner wall surface of the top wall 66 of a metallic housing structure 68 which contains the filter bank configuration shown in FIG. 1. The metallic stripline conductor 36 is prevented from touching the lower wall 67 of the housing by means of a suitable support or spacer shown by reference numeral 69. The vertical alignment of the permanent magnet 50 with respect to the YIG sphere 10 provides a magnetic field $H_o$ which travels through the sphere 10 orthogonally to the direction of the electromagnetic signal conductors 36 and 40. The magnetic circuit is shown being completed through the metallic walls of the housing 68 by the broken line. Since the saturation magnetization $B_s$ of a permanent magnet such as the magnet 50 varies inversely with respect to temperature as shown by FIG. 4 and as described in equation (1), the resonance frequency of a YIG filter utilizing, for example, the configuration shown in FIG. 2, will decrease with increasing temperature according to the following typical expression:

$$f_{res} = 2.8 \text{ MHZ./oersteds} \times H(\text{oersteds})$$

Figure 3:
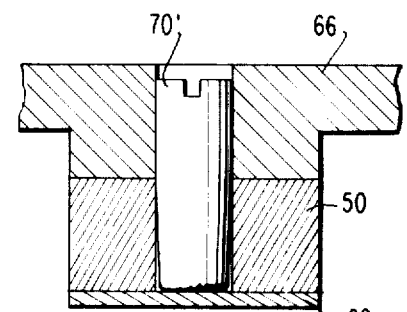
FIG. 3 is a fragmentary cross-sectional view of a second embodiment of a temperature compensated permanent magnet utilized by the subject invention.

This temperature dependence of the magnetic field $H_o$ supplied by the permanent magnet 50 as well as the other permanent magnets 51 ... 55 as shown in FIG. 1 can be partly compensated by including a temperature dependent magnetic shunt around the respective magnet which has a temperature variation in direct opposition to that of the magnet. Thus, one aspect of the invention comprises the inclusion of magnetic shunts 70, 71, 72, 73, 74 and 75 around the outer perimeter of the respective permanent magnets 50, 51, 52, 53, 54 and 55. An alternate embodiment of the magnetic shunt is shown in FIG. 3 and comprises a plug 70' running axially through the center of the magnet 50 as opposed to the sleeve configuration indicated by reference numeral 70 and shown in FIG. 2. It is to be understood, however, that when the embodiment as shown in FIG. 3 is desired, it can be used as well for the other permanent magnets of the configuration shown in FIG. 1 comprising magnets 51, 52, etc.

For a typical permanent magnet 50, made of platinum cobalt (PtCo) at room temperature, the magnetic field typically changes by 1–2 oersteds per degree centigrade depending upon magnetic circuit design. This corresponds to a resonance frequency shift in the order of 3–6 MHz. per degree centigrade. By utilizing a piece of a 30 percent nickel-iron (NiFe) as a magnetic shunt as shown in FIG. 2, a temperature compensation can be provided wherein the frequency shift is reduced to less than 1 MHz. per degree centigrade.

The second aspect of the present invention is that the remaining (1 MHz./°C.) frequency change can be cancelled by selectively orienting the YIG sphere, for example the YIG sphere 10 shown in FIG. 2, with respect to the magnetic field $H_o$ due to the fact that there is an intermediate crystallographic orientation around the [111] axis at which the resonance frequency increases with temperature. This is in direct opposition to U.S. Pat. No. 3,246,263 issued to J. G. Clark, wherein the applied $H_o$ field is applied parallel to the (110) plane and inclined at an angle of approximately 30° degrees to the [100] axis to make the anisotropic field $H_{anis}$ temperature independent. In the subject invention, selective orientation of each of the YIG spheres 10, 11 ... 15 is provided by means of dielectric rods 80, 81, 82, 83, 84 and 85 extending through the ground plane 30 to the respective YIG spheres so that they may be manipulated manually from outside of the housing 68. By manually adjusting the angle at which the $H_o$ magnetic field intersects the [111] axis to a position wherein resonance frequency increases with temperature, this temperature dependence can be made by further manipulation to exactly cancel out that caused by the decrease in saturization magnetization remaining when the magnetic shunt is utilized.

Figure 5:
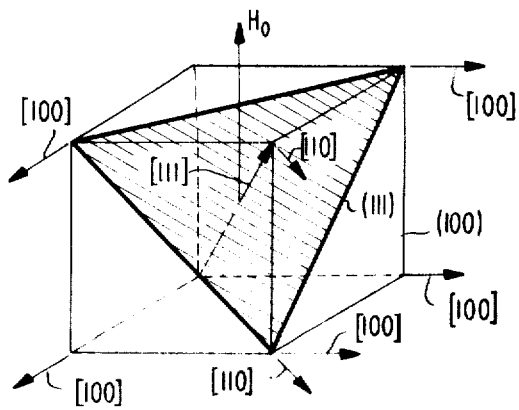
FIG. 5 is a diagrammatic illustration of selected Miller indices of crystallographic planes and directions of a single cubic crystal of gyromagnetic material helpful in understanding one aspect of the present invention.

The illustration in FIG. 5 is a diagrammatic illustration showing the crystallographic orientation of a single cubic crystal of a gyromagnetic material, particularly defining the (111) plane and the [111] axis direction which is normal to the plane and comprises an internal diagonal from the lower rear corner to the mutually opposite upper front corner of the cubic crystal. Additionally, the (111) plane and [111] direction is shown with respect to other Miller indices such as the (100) plane and [100] direction therefor. Also shown in FIG. 5 is a typical or illustrative showing of the application of the $H_o$ field relative to the [111] axis wherein the resonance frequency of the gyromagnetic material increases with temperature.

What has been shown, therefore, is a temperature independent YIG filter utilizing a permanent magnet obtained by means of a combination of a magnetic shunt in combination with the permanent magnet and selective orientation of the YIG sphere around the [111] axis wherein one temperature dependent phenomenon is exactly cancelled out with an equal and opposite temperature dependent phenomenon.

We claim as our invention:

1. An electromagnetic wave device employing magnetized gyromagnetic material for selectively coupling electromagnetic energy between input and output electromagnetic wave conducting means, comprising in combination:

a specimen of a single cubic crystal of gyromagnetic material that exhibits gyromagnetic resonance, the frequency of which is a function of temperature variations, including means for being selectively located between said input and output electromagnetic wave conducting means;

unidirectional magnetic field means having a characteristic whose magnetization value changes in a first direction with respect to a change in temperature and magnetic shunt coupled to said unidirectional magnetic field means, said magnetic shunt having a change in magnetization value in a second direction for said change in temperature, said magnetic field means and said shunt being substantially aligned with said specimen to provide a substantially temperature compensated unidirectional magnetic field through said specimen for magnetically polarizing said specimen in a given direction to exhibit a predetermined resonance frequency; and said specimen being crystallographically oriented relative to said magnetic field wherein the value of the resonance frequency of said specimen changes in said second direction for said change in temperature, said orientation additionally being such that any further variation in said first direction of said magnet means is cancelled out by the crystallographic orientation of said specimen.

2. The combination as defined in claim 1 wherein said specimen of gyromagnetic material is a spherically shaped element.

3. The invention as defined by claim 1 wherein said specimen is comprised of gyromagnetic material selected from the group consisting of yttrium iron garnet, gallium substituted yttrium iron garnet and lithium ferrite.

4. The invention as defined by claim 1 wherein said specimen comprises a YIG sphere having its [111] axis oriented at a predetermined angle relative to said magnetic field.

5. The invention as defined in claim 4 wherein said magnetic shunt comprises a sleeve externally mounted on magnetic field means.

6. The invention as defined in claim 4 wherein said magnetic shunt comprises a shunt member located internally of said magnetic field means.

7. The invention as defined by claim 1 wherein said magnetic field means comprises a permanent magnet comprised of platinum and cobalt and wherein said magnetic shunt comprises a substantially 30 percent nickel-iron shunt member.

8. The invention as defined by claim 1 and additionally including means coupled to said specimen for selectively orienting the [111] axis of said specimen relative to said substantially temperature compensated unidirectional magnetic field.

9. The invention as defined by claim 8 wherein said means coupled to said specimen comprises a dielectric rod.

10. The invention as defined by claim 1 wherein said input and output electromagnetic wave conducting means comprises a first and a second substantially mutually perpendicular strip of conductor material formed on a first and a second dielectric member and wherein said specimen is located in an iris contained in a metallic ground plane located between said first and said second dielectric member, and said magnetic field is orthogonally aligned relative to said first and second strip of conductor material through said specimen.

* * * * *